United States Patent

Nishioka

Patent Number: 5,998,955
Date of Patent: Dec. 7, 1999

[54] PULSE-MOTOR DRIVING APPARATUS

[75] Inventor: Koji Nishioka, Yokohama, Japan

[73] Assignee: Canon Kabushiki Kaisha, Tokyo, Japan

[21] Appl. No.: 08/846,583

[22] Filed: Apr. 17, 1997

[30] Foreign Application Priority Data

Apr. 22, 1997 [JP] Japan ..................... 8-100069

[51] Int. Cl.$^6$ .................................. G05B 11/18
[52] U.S. Cl. .................. 318/696; 318/685; 318/596
[58] Field of Search ................... 318/590, 591, 318/599, 807–811, 685, 696, 594–596, 268, 254, 439, 138; 388/828, 829, 809–815

[56] References Cited

U.S. PATENT DOCUMENTS

| | | | |
|---|---|---|---|
| 3,665,500 | 5/1972 | Lewis et al. ............................. | 318/596 |
| 3,845,378 | 10/1974 | Hendrickson et al. .................. | 318/685 |
| 3,953,774 | 4/1976 | Sato et al. ............................... | 318/594 |
| 4,006,394 | 2/1977 | Cuda et al. ............................. | 360/78.04 |
| 4,728,803 | 3/1988 | Catchpole et al. ...................... | 358/465 |
| 4,855,652 | 8/1989 | Yamashita et al. ..................... | 318/268 |
| 5,317,248 | 5/1994 | Utley et al. ............................. | 318/811 |
| 5,350,987 | 9/1994 | Ueki ........................................ | 318/466 |
| 5,581,452 | 12/1996 | Yamamoto ................................ | 363/41 |
| 5,583,410 | 12/1996 | Jacobson et al. ....................... | 318/690 |
| 5,677,607 | 10/1997 | Sugiyama et al. ...................... | 318/439 |
| 5,723,963 | 3/1998 | Li et al. .................................. | 318/590 |

*Primary Examiner*—Brian Sircus
*Attorney, Agent, or Firm*—Fitzpatrick, Cella, Harper & Scinto

[57] ABSTRACT

For efficient pulse motor drive over a wide speed range, two drive-current control methods are switched in accordance with the speed of the pulse motor. As the first method, a PWM control method generates a pulsewidth modulation signal in accordance with a value indicated by a current control pattern. The pulse-motor drive current is controlled by voltage corresponding to the pulsewidth. As the second method, a BIT control method generates a digital signal corresponding to the value indicated by the current control pattern. The pulse-motor drive current is controlled by voltage corresponding to the digital value.

9 Claims, 10 Drawing Sheets

PULSE-MOTOR DRIVING APPARATUS

BACKGROUND OF THE INVENTION

This invention relates to a pulse-motor driving apparatus used in an image communication apparatus capable of transmitting/receiving image data or copying an image.

As methods for controlling pulse-motor drive current (simply referred to as "drive current") in a conventional pulse-motor driver, mainly BIT control method and PWM control method are known. In the BIT control method, a control signal to control a drive current value of a motor-driver IC is a digital signal. The drive current value is controlled by a signal D/A converted from the digital signal. In the PWM control method, a control signal to control the motor-driver IC is a pulse-width modulation signal (PWM signal). The drive current value is controlled in accordance with a voltage level signal analog-converted from the PWM signal. One of these controls is performed to control a motor-driver current.

However, these conventional controls have the following problems. The BIT control executes the drive current control by D/A conversion. This provides excellent follow-up characteristic of the drive current value with respect to the control signal. However, delicate drive current control is difficult because the steps of current-control by the motor-driver IC are limited. This limits motor-drive torque control. Especially, when the drive speed slows down, as an appropriate torque cannot be obtained, there is a high probability that noise or out-of-synchronization may occur.

The PWM control, which executes drive current control by a voltage level, can perform very delicate drive current control. However, as the control signal is an analog signal, the change of current value has a transient phenomenon. As a result, follow-up characteristic of the drive signal with respect to the control signal becomes poor. Accordingly, if the motor drive speed is increased, the period required to obtain a desired current value of the drive signal is prolonged, which increases the possibility of noise or out-of synchronization.

SUMMARY OF THE INVENTION

The present invention has been made to solve the above problems, and has its object to provide a pulse-motor driving apparatus which smoothly drives a pulse motor within a wide drive-speed range, regardless of change of drive speed, and a control method for the pulse-motor driving apparatus.

According to the present invention, the foregoing object is attained by providing a pulse motor driving apparatus which drives a pulse motor by controlling a drive current to be applied to the pulse motor, comprising: a phase current controller which generates a current control signal corresponding to a control method in accordance with a value of a switching signal, from a current control pattern for each phase, and outputting drive data including the current control signal; and a phase current driver which controls the drive current in accordance with the current control signal.

Further, the above object is attained by providing a pulse-motor driving apparatus comprising: switching-signal generating means for outputting a switching signal; a pattern memory for storing pattern data including phase excitation patterns and current control patterns of respective phases, for a pulse motor; a pattern selector which selects and reads a pattern data from the excitation pattern memory at drive timing corresponding to driving condition of the pulse motor; an output controller which outputs the phase excitation pattern read by the pattern selector, and converts a current control pattern corresponding to the phase excitation pattern into a pulsewidth modulation signal in which a value changes in accordance with periods indicated by the current control pattern, in synchronization with the drive timing if the switching signal has a first value, while outputting a part of the current control pattern as a digital signal if the switching signal has a second value; a phase current driver which outputs a phase excitation signal corresponding to the phase excitation pattern, with a current value corresponding to a pulsewidth of the pulsewidth modulation signal outputted from the output controller, if the switching signal has the first value, while with a current value corresponding to a value indicated by a digital signal, if the switching signal has the second value; and a pulse motor driven by the phase excitation signal.

Further, the above object is attained by providing a pulse motor driving apparatus which drives a pulse motor by controlling a drive current to be applied to the pulse motor, comprising: a phase current controller which generates a current control signal corresponding to a pulsewidth modulation control method for pulsewidth modulating the current control pattern to generate the current control signal, or a digital control method for generating the current control signal as a digital signal from the current control pattern and D/A converting the digital signal by the phase current driver, in accordance with a value of a switching signal, and outputs drive data including the current control signal; a phase current driver which controls the drive current in accordance with the current control signal; and a switching-signal generator which generates the switching signal designating a control method in accordance with a pulse-motor drive speed.

In accordance with the present invention as described above, pulse-motor drive within a wide drive-speed range can be performed with low noise and at high efficiency, by selecting a control by the control selection means.

Other features and advantages of the present invention will be apparent from the following description taken in conjunction with the accompanying drawings, in which like reference characters designate the same name or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

Preferred embodiments of the present invention will now be described in detail in accordance with the accompanying drawings.

First Embodiment

Figure 1:
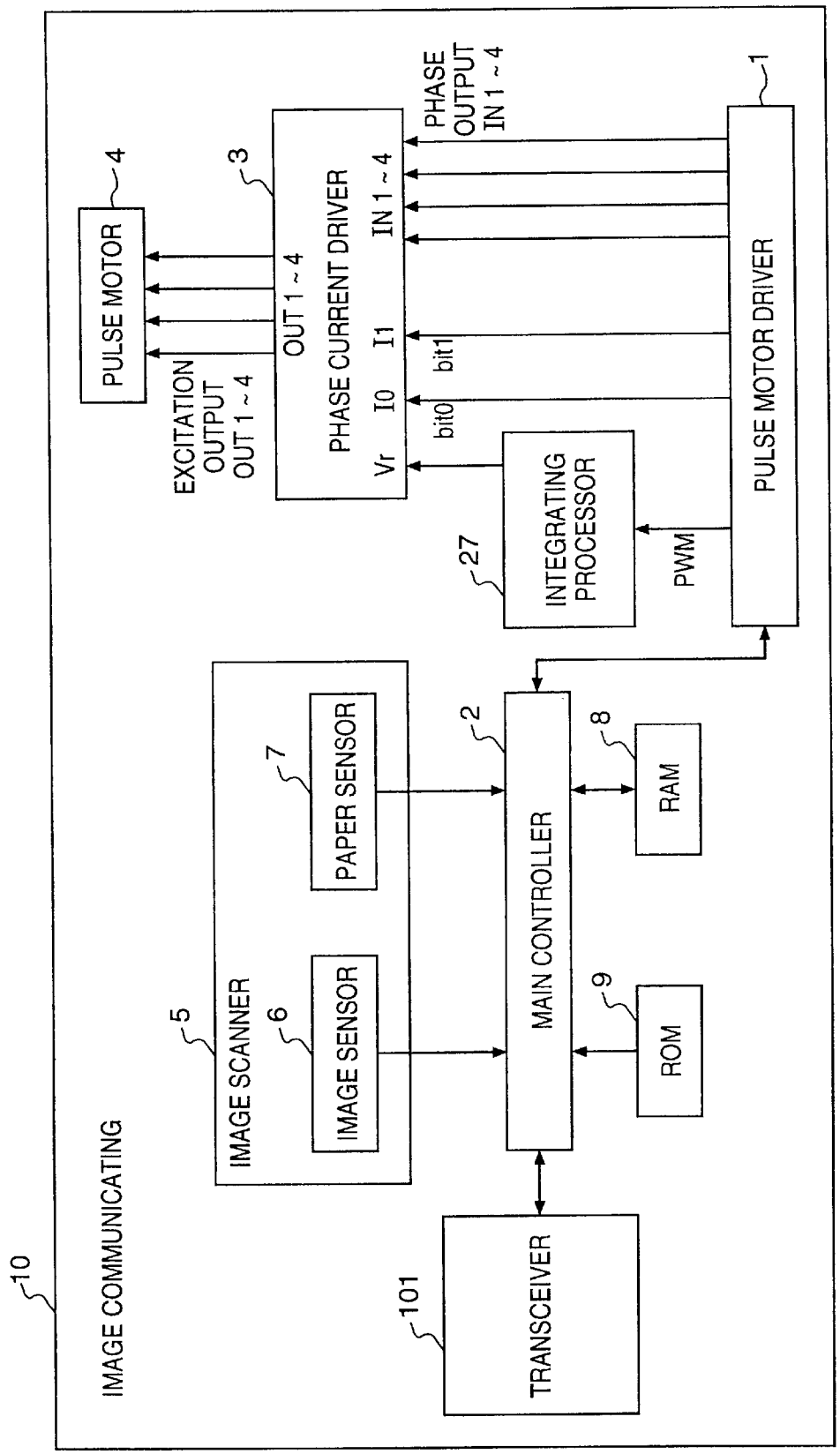
FIG. 1 is a block diagram showing the construction of an image communication apparatus.

The construction of an image communication apparatus such as a facsimile apparatus according to a first embodiment of the present invention will be described with reference to block diagrams. FIG. 1 schematically shows the construction of an image communication apparatus 10.

In FIG. 1, a pulse motor driver 1, of hardware-logic construction, comprises a number of counters and registers. A main controller 2 comprises a microprocessor or the like. A phase current driver 3 drives a pulse motor 4 in accordance with drive data outputted from the pulse motor driver 1. An integrating processor 27 integrates a pulsewidth modulation signal outputted from the pulse motor driver 1, and outputs the integrated signal to the phase current driver 3. An image scanner 5 reads image data on a paper conveyed by the pulse motor 4. An image sensor 6, included in the image scanner 5, converts an optical signal into an electric signal. A paper sensor 7 detects the paper conveyed by the pulse motor 4. A RAM (Random Access Memory) 8 is used for storing data which an operator can set. A ROM (Read Only Memory) 9 is used for storing programs for the main controller 2 having the microprocessor or the like, operator messages and the like. A transceiver 101 transmits image data read by the image scanner 5 to another image communication apparatus and the like.

Figure 2:
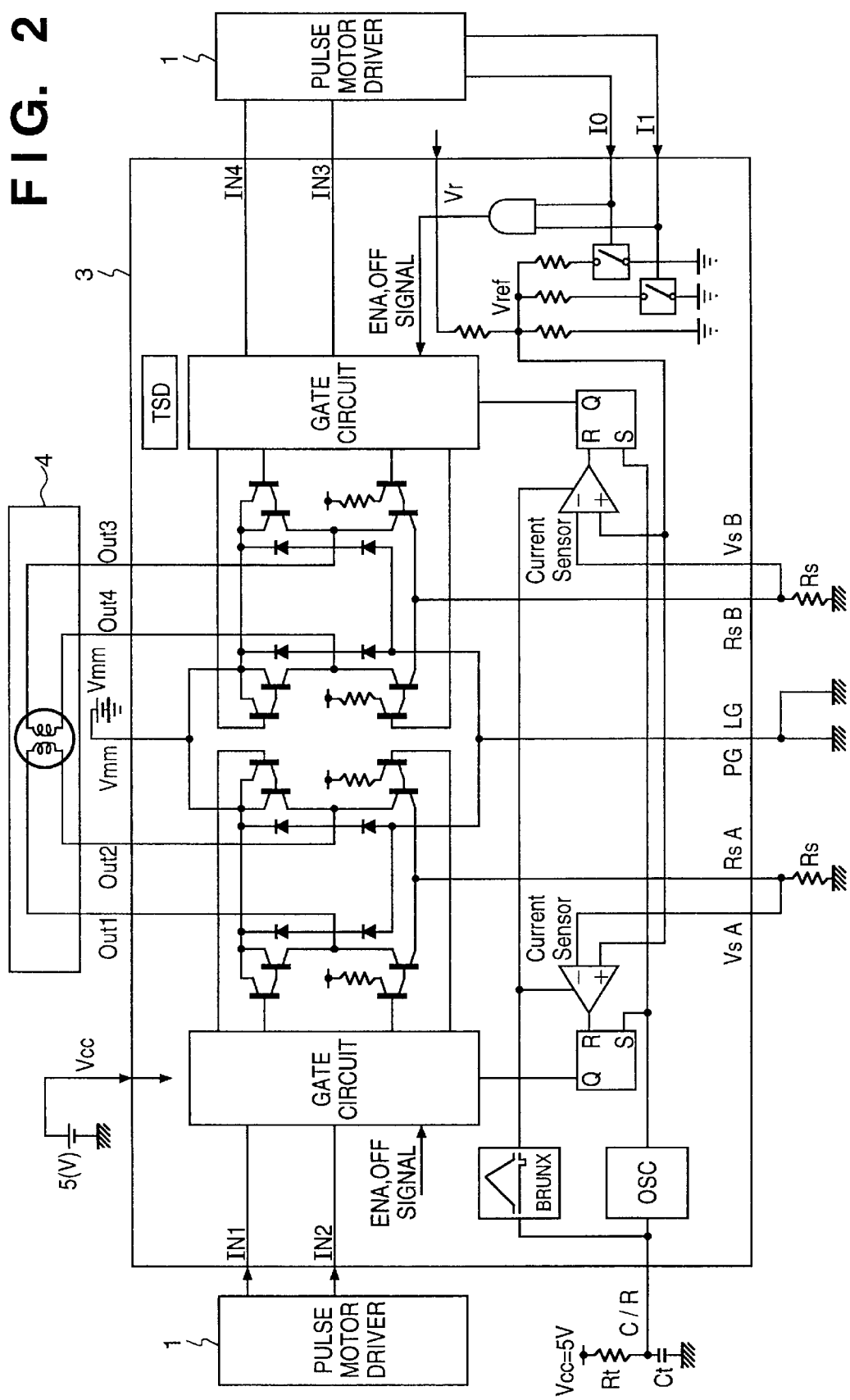
FIG. 2 is a block diagram showing the construction of a phase current driver.
Figure 9:
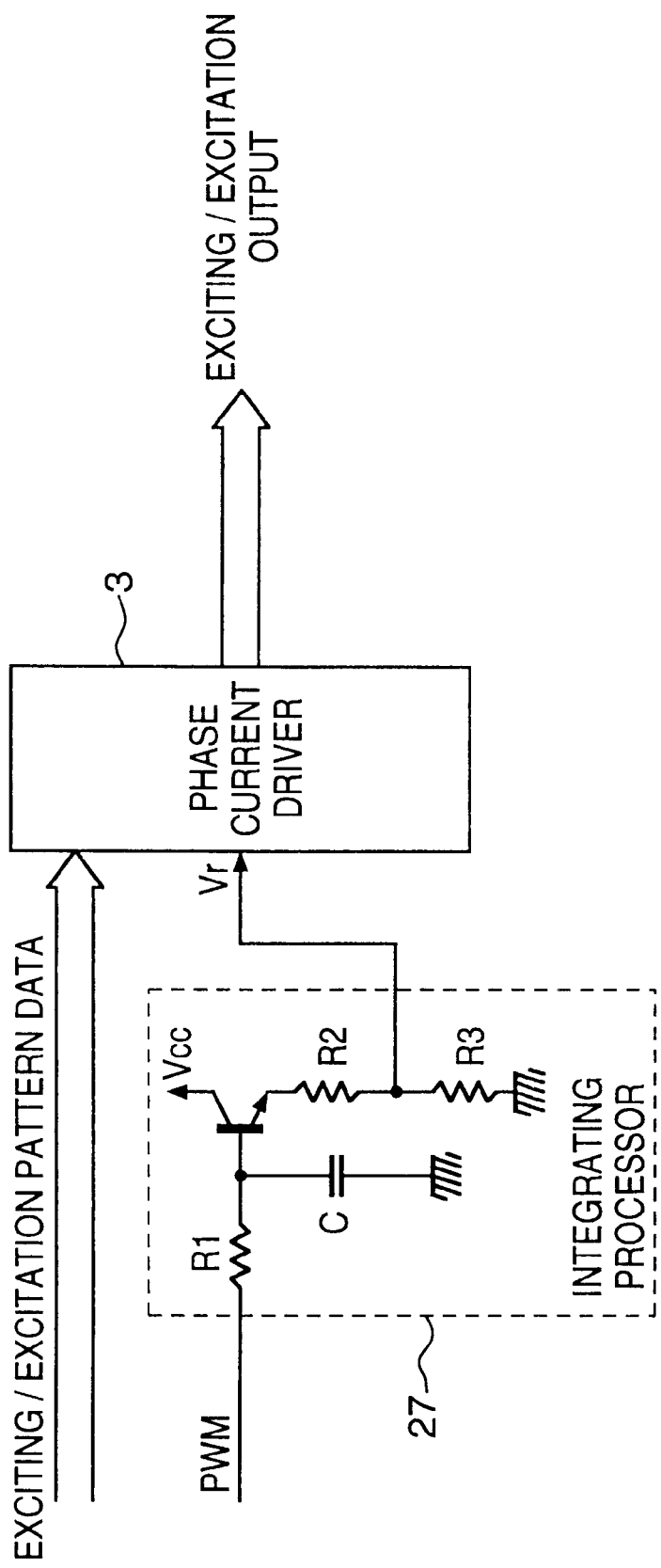
FIG. 9 is a block diagram showing the construction for PWM control.

FIG. 2 shows the construction of the phase current driver 3 (motor driver IC). In FIG. 2, phase-excitation patterns for the pulse motor are inputted into the terminals IN1 to IN4 from a CPU or gate arrays. A C/R terminal is connected to resistance (Rt) and capacitance (Ct). The chopping frequency of a current value to be outputted to the motor is selected by the external capacitance Ct and resistance Rt. Terminals OUT1 to OUT4 output phase-excitation signals (OUT1 to OUT4) corresponding to the inputs from the terminals IN1 to IN4 to the pulse motor 4. Terminals Vr, I0 and I1 input signals to control the output current values of the phase-excitation signals OUT1 to OUT4. When the terminal Vr is employed, drive current is controlled by directly inputting an analog voltage value, determined by an external resistance Rs and a desired motor-drive current value. In this embodiment, the PWM control by pulsewidth modulation is used as a method for controlling the analog-voltage value. As an external circuit for the PWM control is the integrating processor 27 as shown in FIG. 9. Further, the BIT control using a digital signal can be performed by employing the terminals I0 and I1. That is, the present embodiment selectively performs the PWM control and the BIT control.

Figure 3:
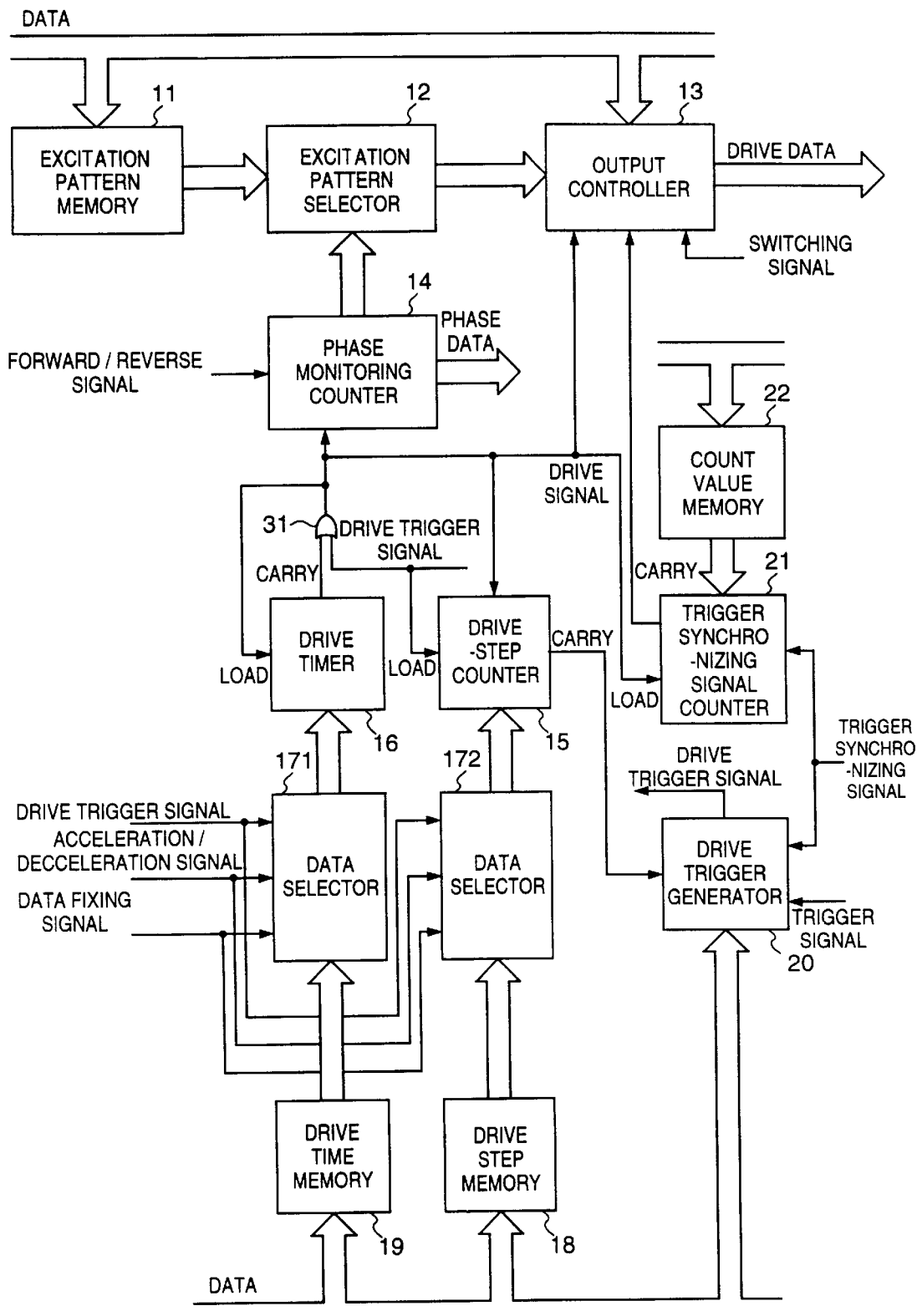
FIG. 3 is a block diagram showing the construction of a pulse motor driver according to a first embodiment.

FIG. 3 shows the construction of the pulse motor driver 1. An excitation pattern memory 11 is used for storing excitation patterns for driving the pulse motor, and current control patterns for the respective phases. An excitation pattern selector 12 sequentially selects pattern data including a phase current pattern and a current control pattern from the excitation pattern memory 11, in accordance with the parameter inputted from a phase monitoring counter 14, so as to smoothly drive the pulse motor. An output controller 13 outputs the phase excitation pattern selected by the excitation pattern selector 12. At this time, the output controller 13 generates a desired current control signal (PWM signal or signals bit0 and bit1) by using the current control pattern of the phase and a switching signal for switching the drive-current controls, and outputs the current control signal with the phase excitation pattern. More specifically, the phase monitoring counter 14 counts drive signals, and outputs a parameter to select an appropriate excitation pattern in the excitation pattern memory 11. Further, by inputting a forward/reverse signal, the rotation of the pulse motor is made in a forward/reverse direction. The drive signal defines motor drive timing in accordance with an acceleration/deceleration signal, a data fixing signal and the like, inputted in correspondence with motor driving status. The drive signal is obtained from the logical sum of a carry signal from a drive timer 16 and a drive trigger signal from a drive trigger generator 20.

A drive step counter 15 counts the number of actual pulse-motor drive steps at a desired drive speed by counting the drive signals. The drive timer 16 outputs the drive signal to change excitation phases of the pulse motor at a desired drive speed. Data selectors 171 and 172 sequentially select data to be inputted into the drive step counter 15 and the drive timer 16, in accordance with input of the drive trigger signal, the acceleration/deceleration signal, the data fixing signal and the like. The acceleration/deceleration signal, the data fixing signal, the forward/reverse signal and the like are inputted from the main controller 2 in accordance with motor drive status. A drive step memory 18 holds step data, on number of motor-drive steps, to be outputted to the data selector 172. A drive time memory 19 holds time data, on driving time of the motor, to be outputted to the data selector 171.

The drive trigger generator 20 generates the drive trigger signal as a drive signal for actually driving the motor, by using a trigger signal and a trigger synchronizing signal inputted from the main controller 2 and a carry signal from the drive step counter 15. The logical sum of the drive trigger signal and the carry signal from the drive timer 16 is outputted from a logical OR gate 31. This output signal from the logical OR gate 31 is the drive signal. A trigger-synchronizing signal counter 21 counts the trigger synchronizing signals inputted from the main controller 2. Further, the trigger-synchronizing signal counter 21 loads an initial value from a count value memory 22, with the drive signal from the drive timer 16 and the drive trigger generator 20 as a load signal. The count value memory 22 holds a value to be set at the trigger-synchronizing signal counter 21. Note that this block diagram does not show clock terminals, however, all the counters and memories are driven with the same clock.

Figure 4:
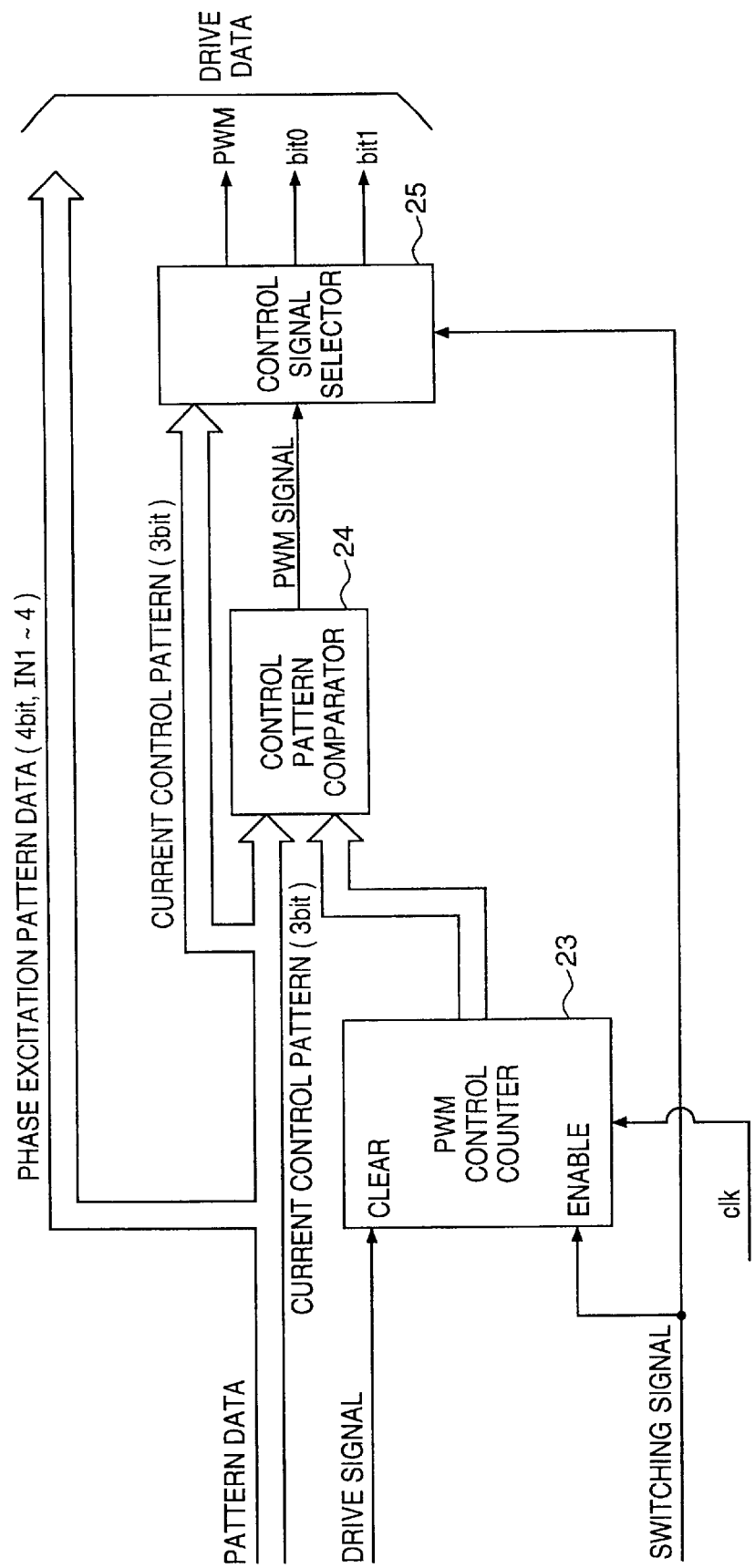
FIG. 4 is a block diagram showing the construction of an output controller.

FIG. 4 shows the construction of the output controller 13. A PWM control counter 23 inputs the drive signal as clear input, and inputs the switching signal as enable input. As the drive signal is inputted, the PWM control counter 23 is cleared. When the PWM control is selected by the switching signal, the PWM control counter 23 starts operation. A control pattern comparator 24 compares the current control pattern with the output value from the PWM control counter 23. If these values are equal to each other or the output from the PWM control counter 23 is greater than the current control pattern, the output of the control pattern comparator 24 changes. The output of the control pattern comparator 24 is inputted as a PWM signal into the phase current driver 3. A control signal selector 25 selects the PWM signal or BIT signals for controlling drive current to be outputted to the phase current driver 3. In the present embodiment, the BIT control is made with two bits, however, there is no limitation on the number of bits in the present invention.

Figure 5:
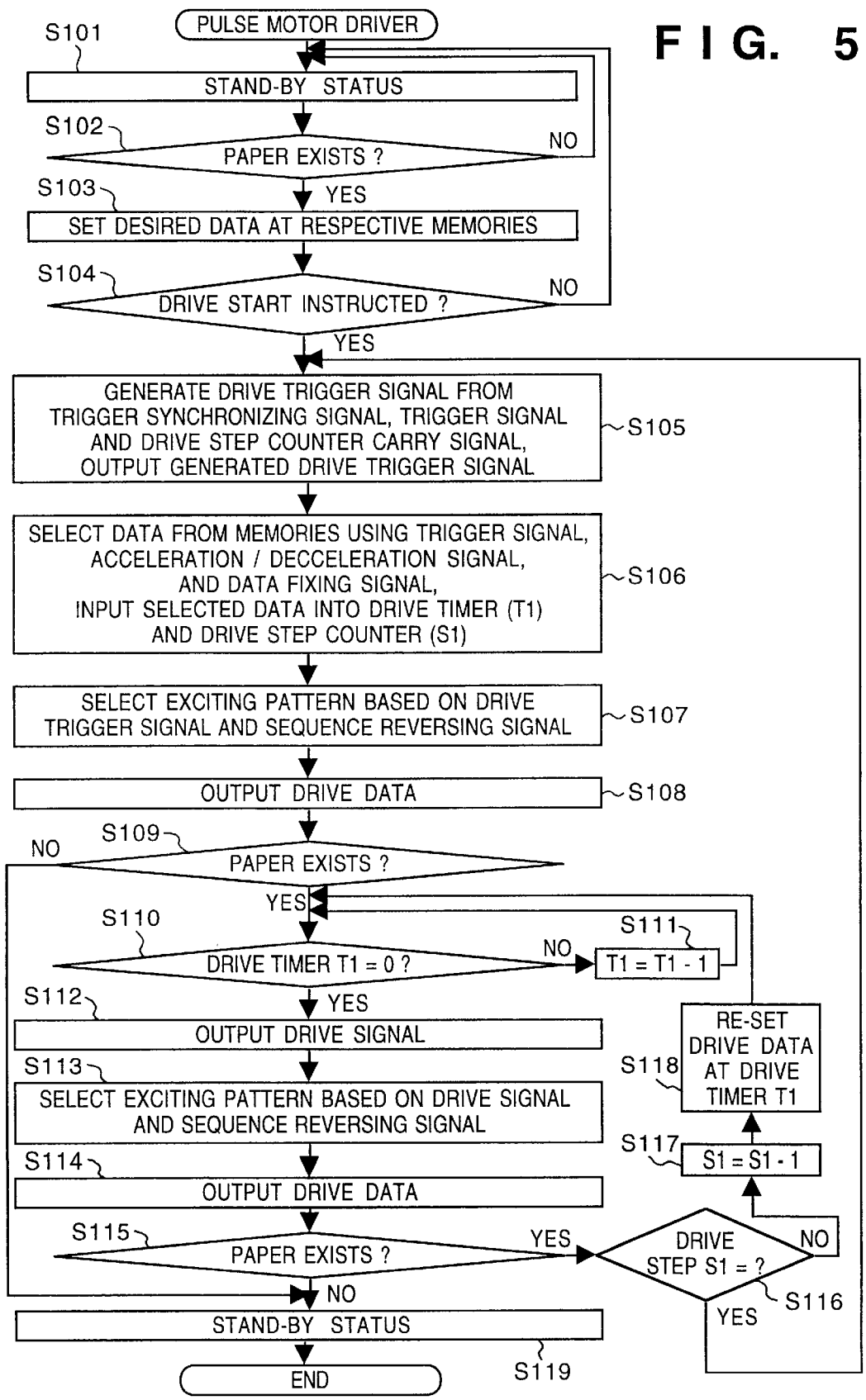
FIG. 5 is a flowchart showing the basic control according to the first embodiment.

Next, the control of the first embodiment will be described. FIG. 5 is a flowchart showing the basic control of the present embodiment. Note that steps S101 to S104, S109, S115 and S119 are control steps executed by the main controller 2, and the other steps are operation steps executed by the pulse motor driver 1.

At step S101, the image communication apparatus is in stand-by status. At step S102, it is determined by the paper sensor 7 that paper has been set in the apparatus. If it is determined at step S102 that the paper does not exist, the process returns to step S101, while if it is determined that the paper exists, the process proceeds to step S103. At step S103, desired data are respectively set in the excitation pattern memory 11, the drive step memory 18 and the drive time memory 19.

At step S104, if it is determined that external input such as key-input instructing to start driving has been made, the process proceeds to step S105, while if it is determined that such drive-start instruction has not been made, the process returns to step S101. At step S105, the drive trigger signal is outputted from the drive trigger generator 20, by using the trigger synchronizing signal and the trigger signal inputted by interruption processing from the main controller 2 and the carry signal from the drive step counter 15. At step S106, data is selected from the respective memories by using the drive trigger signal, and the selected data is set at the drive step counter 15 (S1) and the drive timer 16 (T1). The data set at this time are desired drive time and a desired number of drive steps selected from the drive time memory 18 and the drive step memory 19, in accordance with the values of the acceleration/deceleration signal and data fixing signal from the main controller 2.

At step S107, the drive trigger signals are counted by the phase monitoring counter 14, and the count value is outputted to the excitation pattern selector 12. The excitation selector 12 selects a new excitation pattern from the excitation pattern memory 11. At this time, forward/reverse rotational direction of the motor drive is determined, by incremental counting or decremental counting of the phase monitoring counter 14 in accordance with the forward/reverse signal from the main controller 2. At step S108, the drive data is outputted via the output controller 13 to the phase current driver 3. The pulse motor 4 rotates by one step based on this output.

At step S109, existence/absence of paper is determined by the paper sensor 7. If the paper does not exist, the process proceeds to step S119, while if the paper exists, proceeds to step S110.

At step S110, it is determined whether or not the drive timer value T1 set at step S106 is "0". If YES, the process proceeds to step S112, while if NO, proceeds to step S111. At step S111, drive timer T1 is decremented. At step S112, as the count value of the drive timer 16 has become "0" (T1=0), the drive signal is outputted. At step S113, the drive signal is counted by the phase monitoring counter 14. The count value of the phase monitoring counter 14 is outputted to the excitation pattern selector 12 so as to select a new excitation pattern from the excitation pattern memory 11. At this time, forward/reverse rotational direction of the motor drive is determined by incremental counting or decremental counting by the phase monitoring counter 14 in accordance with the forward/reverse signal from the main controller 2. At step S114, in accordance with the excitation pattern selected at step S113, the drive data is outputted via the output controller 13 to the phase current driver 3. The pulse motor 4 rotates one step based on this output.

At step S115, existence/absence of paper is determined by the paper sensor 7. If paper does not exist, the process proceeds to step S119, while if the paper exists, proceeds to step S116.

At step S116, it is determined whether or not the drive step value S1 set at step S106 is "0". If YES, the process returns to step S105 to repeat the processing from step S105. If NO, the drive step value S1 is decremented. At step S118, the data selected at step S106 is re-set at the drive timer 16, and the process proceeds to step S110, to repeat the processing from step S110.

Figure 6:
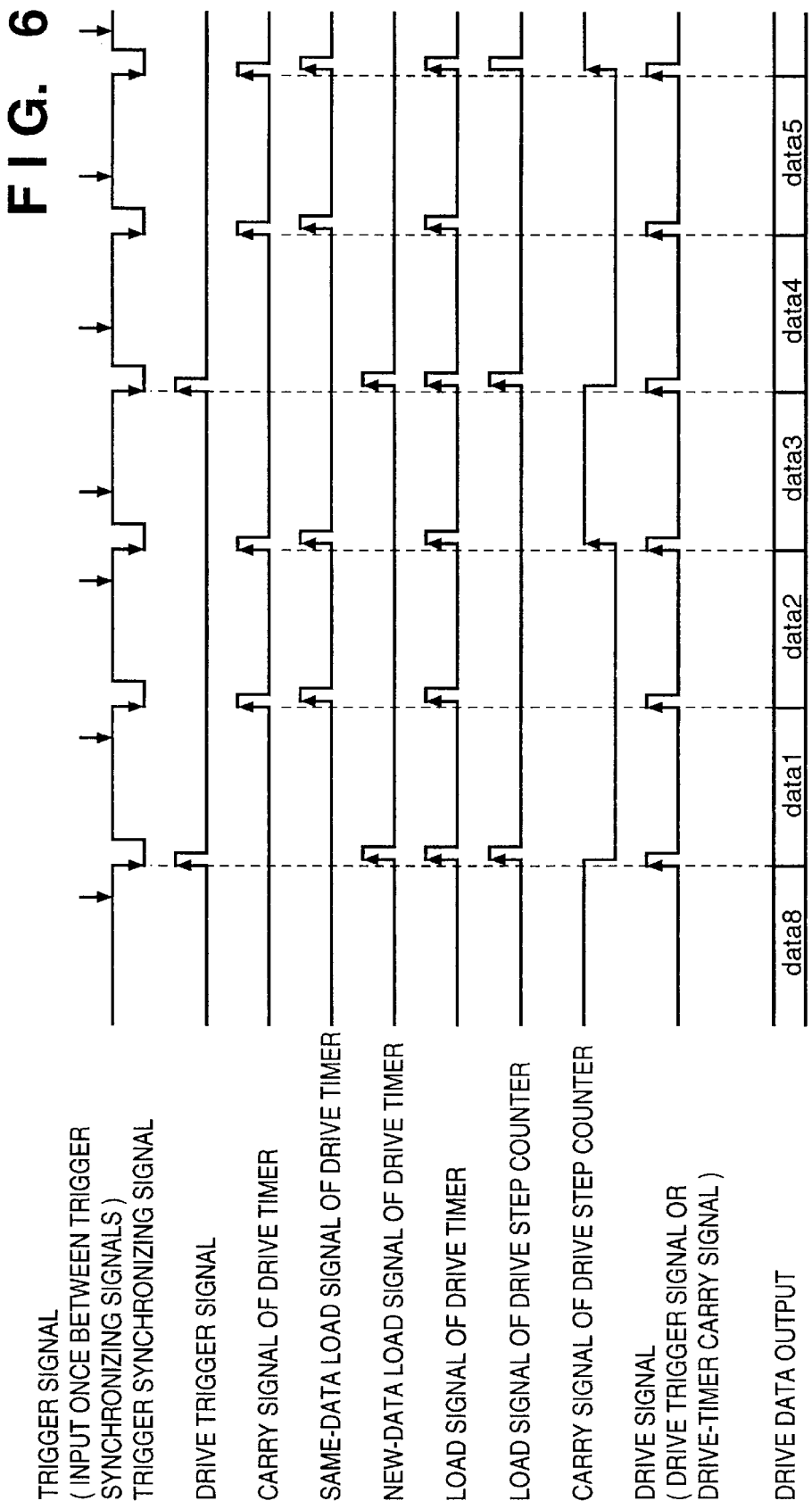
FIG. 6 is a timing chart showing basic control timings.

FIG. 6 is a timing chart showing the basic timings of the control as shown in FIG. 5. As shown in FIG. 5, the drive trigger signal is outputted by using the trigger signal and the trigger synchronizing signal as interruption signals from the main controller 2, to start driving the pulse motor. The output of the drive trigger signal is made based on the output of the carry signal from the drive step counter 15. The drive signal as a signal for driving the motor is composed of the drive trigger signal and the carry signal from the drive timer 16. As described above, the output of the drive trigger signal is made based on the output of the carry signal from the drive step counter 15. When the drive trigger signal is outputted, newly selected data is set at the drive timer 16 and the drive step counter 15. When no drive trigger signal exists, the data that has been loaded for the previous pulse motor drive is re-set at the drive timer 16. This operation is repeated. In a case where the trigger signal from the main controller 2 is not inputted, the pulse motor drive stops.

Figure 7:
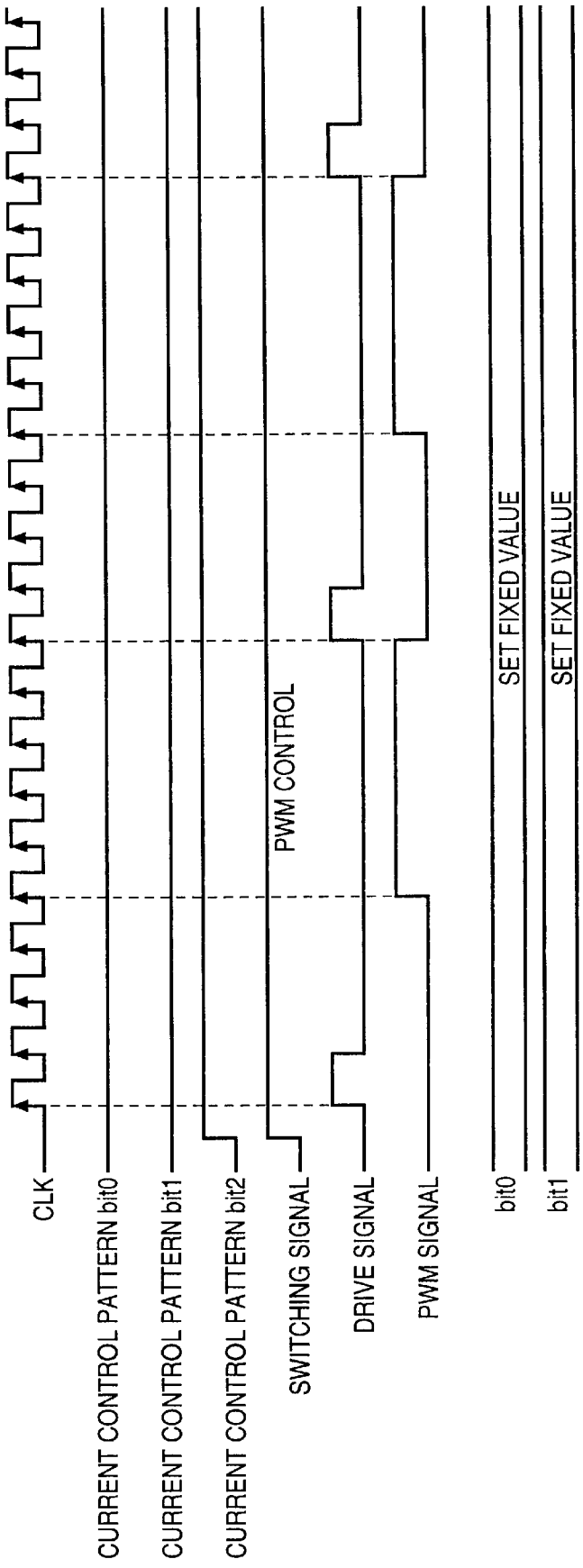
FIG. 7 is a timing chart showing PWM control timings.
Figure 8:
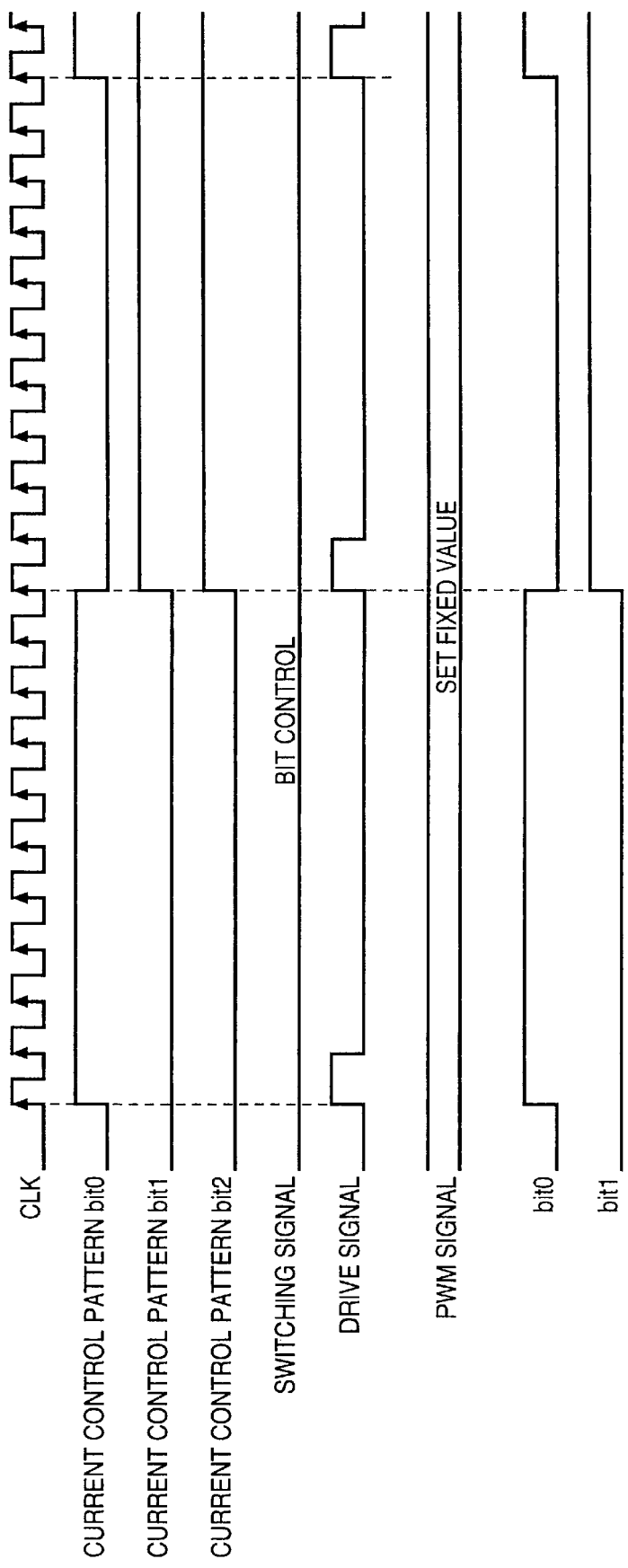
FIG. 8 is a timing chart showing BIT control timings.

Next, switching of the drive-current control methods to drive the drive current of the output controller 13 in FIG. 4 will be described. FIGS. 7 and 8 are timing charts respectively showing control timings of the PWM control and the BIT control. In the present embodiment, the PWM control counter 23, the control pattern comparator 24 both have three-bit construction, and the BIT control is performed by two bits. However, there is no limitation on the number of bits in the present invention.

In FIG. 7, when the level of the switching signal becomes high designating the PWM control, the PWM control counter 23 receives enable input, and starts counting a clock signal CLK. Since the value of the data inputted into the control pattern comparator 24 is "04H" (bit0, 1, 2=0, 0, 1), when the count value of the PWM control counter 23 has become 04H or greater, the PWM signal changes. Further, since the PWM control is designated by the switching signal, the control signal selector 25 outputs the PWM signal. This output is inputted into the integrating processor 27 as shown in FIG. 9, thereby a voltage level Vr corresponding to a desired output current value is outputted to the phase current driver 3. The phase current driver 3 generates desired excitation output by using the excitation pattern data and the voltage level Vr from the integrating processor 27, and drives the pulse motor 4 by outputting the excitation output to the pulse motor 4. At this time, the terminals bit0 and bit1 output predetermined values.

On the other hand, as shown in FIG. 8, when the level of the switching signal becomes low designating the BIT control, the PWM control counter 23 does not operate (in disabled status). Then the control signal selector 25 outputs the bit0 signal and the bit1 signal. These signals are inputted into the terminals I0 and I1 as shown in FIG. 2, thereby a voltage level Vref corresponding to the desired output current value is generated as four-step analog value. Then the phase current driver 3 generates desired excitation output by using the excitation pattern data and the voltage level Vref, and drives the pulse motor 4 by outputting the excitation output to the pulse motor 4. At this time, the terminal PWM outputs a predetermined value.

Note that the main controller 2 changes the switching signal in accordance with the pulse-motor drive speed.

Specifically, when the pulse motor drive speed is slower than a predetermined speed, the main controller 2 changes the switching signal to designate the PWM control while when the pulse motor drive speed is faster than the predetermined speed, the main controller 2 changes the switching signal to designate the BIT control. The predetermined speed may be experimentally obtained in correspondence with the motor drive.

By the above construction, the image communicating apparatus of the present embodiment stores the period of motor drive signal, the number of drive steps and the excitation patterns into the drive time memory 19, the drive step memory 18 and the excitation pattern memory 11, reads these data in accordance with an input signal and generates a drive signal for driving the motor. As parameters for pulse motor control can be changed by pre-setting the values at the respective memories or setting the values from the main controller 2, flexible control in correspondence with driving condition can be performed.

Further, the BIT control and the PWM control can be switched by changing the value of the switching signal by the main controller 2. When the motor drive speed is slow, the PWM control is selected for delicate drive current control, while when the motor drive speed is fast, the BIT control is selected for pulse motor drive without degradation of follow-up characteristic of the drive signal to the change of control signal.

Second Embodiment

Next, a second embodiment of the present invention will be described. In this embodiment, the image communication apparatus, the phase current driver 3 and the output controller 13 have the same constructions as those in the first embodiment, and the control flowchart and the control timing charts are the same as those in the first embodiment, i.e., FIGS. 1, 2 and 4 to 9 are also used in the description of the second embodiment.

Figure 10:
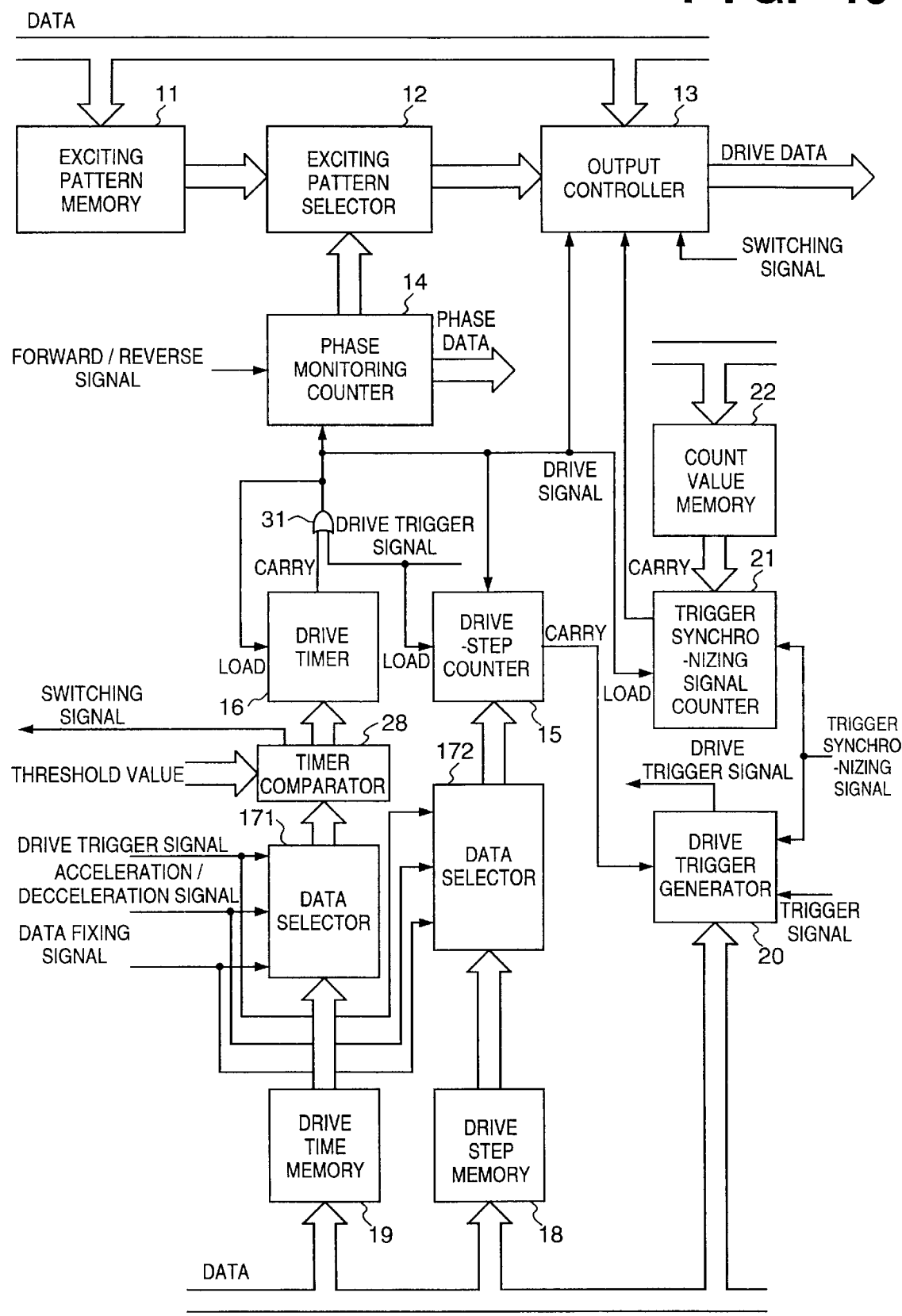
FIG. 10 is a block diagram showing the construction of the pulse motor driver according to a second embodiment.

FIG. 10 shows the construction of the pulse motor driver 1. The construction in FIG. 10 is the same as that in FIG. 1 except that a timer comparator 28 which inputs a value set in the drive timer 16 is added. The timer comparator 28 compares an arbitrarily-set threshold value with the value selected by the data selector 171, and outputs a switching signal to change the drive current control in accordance with the relation between these values. The selected value by the data selector 171 is set in the timer 16. For example, if the value selected by the data selector 171 is greater than the threshold value, the timer comparator 28 outputs the switching signal to select the PWM control, otherwise, outputs the switching signal to select the BIT control.

This enables the pulse motor driver 3 to automatically select a drive current control for the pulse motor, without control of the main controller 2. In the pulse motor driving of the present embodiment, a pulse-motor drive speed for switching the BIT control and the PWM control is set as the threshold value at the timer comparator 28 in advance, so that the drive current control can be automatically changed. Further, if it may be arranged such that the threshold value can be set from the main controller 2, which enables flexible control in accordance with driving condition.

Note that the present invention is applicable to various devices using a pulse motor as well as an image scanner. Especially, the present invention is highly effective when applied to a device using the pulse motor in a wide speed range.

As described above, according to the present invention, the drive current control method for driving a pulse motor can be easily changed by a single switching signal. If the drive speed is fast, the BIT control is selected, so that the pulse motor can be driven without degrading the follow-up characteristic of the drive current to control signals. If the drive speed is slow, the PWM control is selected, so that very delicate drive current control can be performed to drive the pulse motor with low noise. This enables low-noise and high efficient pulse-motor drive at a wide speed range.

The present invention is not limited to the above embodiments and various changes and modifications can be made within the spirit and scope of the present invention. Therefore, to apprise the public of the scope of the present invention, the following claims are made.

What is claimed is:

1. A pulse-motor driving apparatus comprising:

switching-signal generating means for generating a switching signal such that the switching signal has a first value when the speed of a pulse motor is faster than a predetermined speed, and the switching signal has a second value when the speed of the pulse motor is slower than the predetermined speed;

a pattern memory for storing pattern data including phase excitation patterns and current control patterns of respective phases, for a pulse motor;

a pattern selector which selects and reads pattern data from said excitation pattern memory at a drive timing corresponding to driving condition of said pulse motor;

an output controller which outputs the phase excitation pattern read by said pattern selector, and converts a current control pattern corresponding to the phase excitation pattern into a pulsewidth modulation signal in which a value changes in accordance with periods indicated by the current control pattern, in synchronization with the drive timing if the switching signal has the first value, while outputting a part of the current control pattern as a digital signal if the switching signal has the second value;

a phase current driver which outputs a phase excitation signal corresponding to the phase excitation pattern, with a current value corresponding to a pulsewidth of the pulsewidth modulation signal outputted from said output controller, if the switching signal has the first value, while with a current value corresponding to a value indicated by a digital signal, if the switching signal has the second value; and a pulse motor driven by the phase excitation signal.

2. A pulse motor driving apparatus which drives a pulse motor by controlling a drive current to be applied to said pulse motor comprising:

first signal generation means for generating a first current control signal for driving the pulse motor by pulsewidth modulation;

second signal generation means for generating a second current control signal, as a digital signal, for driving the pulse motor;

excitation pattern signal generation means for generating an excitation pattern signal for driving the pulse motor;

a phase current driver for controlling a drive current to be applied to the pulse motor according to a current control signal and the excitation pattern signal, wherein said chase current driver generates an excitation output signal for driving the pulse motor by using the level of a pulsewidth modulated signal and the excitation pattern signal when the pulsewidth modulated signal is applied as the current control signal, and generates the excitation output signal by using the value of a digital signal and the excitation pattern signal when the digital signal is applied as the current control signal; and selection means, when the drive speed of the pulse motor is slower than the predetermined speed, for selecting the first current control signal as the current control signal to be applied to the phase current driver, and when the drive speed of the pulse motor is faster than the predetermined speed, selecting the second current control signal as the current control signal to be applied to the phase current driver.

3. The pulse-motor driving apparatus according to claim 2, wherein said phase current driver includes integration means for integrating a pulsewidth modulated signal.

4. An apparatus according to claim 2, wherein a PWM method is utilized to control the drive current by applying the first current control signal to the phase current driver, and a BIT method is utilized to control the drive current by applying the second current control signal to the phase current driver.

5. An apparatus according to claim 4, wherein the phase current driver has a digital-to-analog converter which converts the second current control signal generated by said second signal generation means to an analog signal.

6. A pulse motor driving apparatus which drives a pulse motor by controlling a drive current to be applied to said pulse motor comprising:

first signal generation means for generating a first current control signal for driving the pulse motor by pulsewidth modulation;

second signal generation means for generating a second current control signal, as a digital signal, for driving the pulse motor;

excitation pattern signal generation means for generating an excitation pattern signal for driving the pulse motor;

a phase current driver for controlling a drive current to be applied to the pulse motor according to a current control signal and the excitation pattern signal, wherein said phase current driver generates an excitation output signal for driving the pulse motor by using the level of a pulsewidth modulated signal and the excitation pattern signal when the pulsewidth modulated signal is applied as the current control signal, and generates the excitation output signal by using the value of a digital signal and the excitation pattern signal when the digital signal is applied as the current control signal;

switch signal generation means for generating a switch signal having a first value when speed of the pulse motor is slower than a predetermined speed and generating the switch signal having a second value when speed of the pulse motor is faster than the predetermined speed; and selection means, when the switch signal generation means generates the switch signal having the first value, for selecting the first current control signal as the current control signal to be applied to the phase current driver, and when the switch signal generation means generates the switch signal having the second value, selecting the second current control signal as the current control signal to be applied to the phase current driver.

7. The pulse-motor driving apparatus according to claim 6, wherein said selection means includes a drive time memory for storing time period for outputting drive data to said pulse motor, a drive step memory for storing a cycle of changing the time period, and a pattern memory for storing current control patterns, and wherein said selection means reads values from said respective memories in accordance with input control signals, and generates the current control signal.

8. An apparatus according to claim 7, wherein said switch signal generation means includes a comparator which compares a time value read from drive time storage means with a predetermined value, and wherein said switch signal generation means generates the switch signal having the first value when the time value is greater than the predetermined value and generates the switch signal having the second value when the time value is smaller than the predetermined value.

9. The pulse-motor driving apparatus according to claim 6, further comprising:

a pulse motor driven by drive current controlled by said phase current driver; and an image reader which reads an image on a medium conveyed by said pulse motor.

* * * * *

UNITED STATES PATENT AND TRADEMARK OFFICE
CERTIFICATE OF CORRECTION

PATENT NO. : 5,998,955
DATED : December 7, 1999
INVENTOR(S) : KOJI NISHIOKA

It is certified that error appears in the above-identified patent and that said Letters Patent is hereby corrected as shown below:

COLUMN 5

Line 44, "proceeds" (second occurrence) should read
--it proceeds--;
Line 48, "proceeds" (second occurrence) should read
--it proceeds--;
Line 66, "proceeds" (second occurrence) should read
--it proceeds--.

COLUMN 8

Line 62, "chase" should read --phase--.

Signed and Sealed this

Ninth Day of January, 2001

Attest:

Q. TODD DICKINSON

Attesting Officer    Commissioner of Patents and Trademarks